(12) United States Patent
Yamashita et al.

(10) Patent No.: US 8,395,588 B2
(45) Date of Patent: Mar. 12, 2013

(54) TOUCH PANEL

(75) Inventors: Yuichiro Yamashita, Ebina (JP);
Michiko Johnson, Machida (JP); Shin Hasegawa, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 1158 days.

(21) Appl. No.: 12/210,044

(22) Filed: Sep. 12, 2008

(65) Prior Publication Data

US 2009/0073142 A1    Mar. 19, 2009

(30) Foreign Application Priority Data

Sep. 19, 2007  (JP) .................................. 2007-242910
May 22, 2008  (JP) .................................. 2008-134654

(51) Int. Cl.
*G06F 3/041* (2006.01)
(52) U.S. Cl. ...................................................... 345/173
(58) Field of Classification Search ........... 345/173–176
See application file for complete search history.

(56) References Cited

U.S. PATENT DOCUMENTS

| 4,868,551 | A | 9/1989 | Arditty et al. |
| 6,597,348 | B1 | 7/2003 | Yamazaki et al. |
| 7,385,594 | B2 | 6/2008 | Liao et al. |
| 7,465,914 | B2 | 12/2008 | Eliasson et al. |
| 2008/0179507 | A2 * | 7/2008 | Han .............................. 250/224 |

FOREIGN PATENT DOCUMENTS

| JP | 62-107325 | 5/1987 |
| JP | 64-031439 | 2/1989 |
| JP | 10-162698 | 6/1998 |
| JP | 2000-259347 | 9/2000 |
| JP | 2004-227365 | 8/2004 |
| JP | 2005-235174 | 9/2005 |
| JP | 2007-505297 | 3/2007 |
| JP | 2007-156648 | 6/2007 |

* cited by examiner

*Primary Examiner* — Ke Xiao
(74) *Attorney, Agent, or Firm* — Fitzpatrick, Cella, Harper & Scinto (57) ABSTRACT

A touch panel includes a light guide including a first face for detecting the position of an object in contact therewith and a second face opposite the first face, and a line sensor for receiving light emitted from a side face of the light guide plate, wherein, of light irradiated from the second face side, the light guide guides toward the side face the portion of light reflected by the object.

9 Claims, 11 Drawing Sheets

TOUCH PANEL

BACKGROUND OF THE INVENTION

1. Field of the Invention

The present invention relates to a touch panel, and more particularly, to an optical touch panel.

2. Description of the Related Art

Touch panels are now used which can give an instruction to an apparatus when an interface image projected onto a display is touched. While there are a variety of specific operating principles for touch panels, touch panels are requested which have sufficient mechanical strength and high transmittance. In response to such requests, in order to provide mechanical strength, various optical touch panels have been proposed which use an optical detection mechanism. Further, in optical touch panels, in order to reduce the effect of contamination of the detection mechanism, structures have been proposed for preventing light emitting surfaces for use in detection and detection sensor light receiving surfaces from being exposed on the surface.

Figure 12:
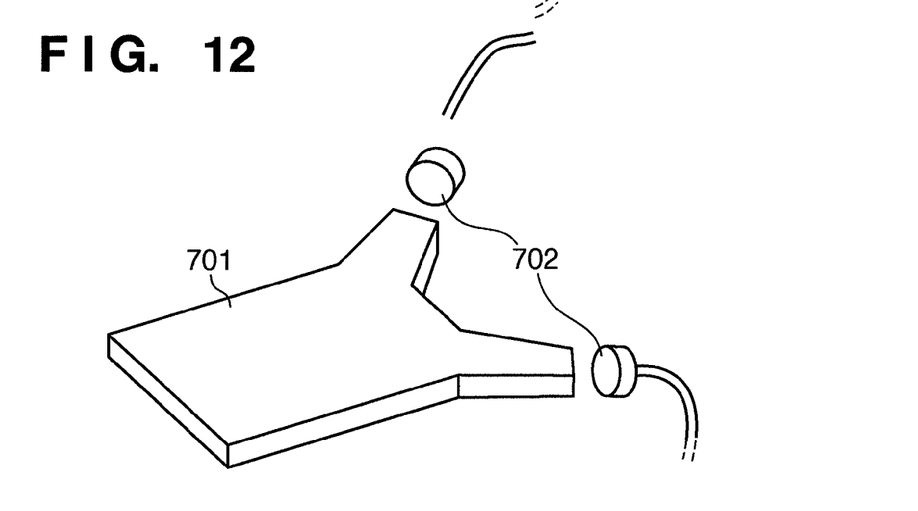
FIG. 12 is a diagram illustrating an example of a conventional touch sensor.

FIG. 12 is a diagram illustrating an optical touch panel with a light emitting surface and a light receiving surface unexposed on the surface, which is disclosed in U.S. Pat. No. 4,868,551. According to U.S. Pat. No. 4,868,551, a detection surface 701 composed of a light guide plate is disposed at a front of a CRT that is a scanning display device, and light for detection is scanning and directed to the light guide plate. Then, the reflected light is detected by a light receiving element 702, and the time when the light returns is used to calculate where on the scanning lines the light is located at that time so as to detect the location of contact of an object.

Figure 13:
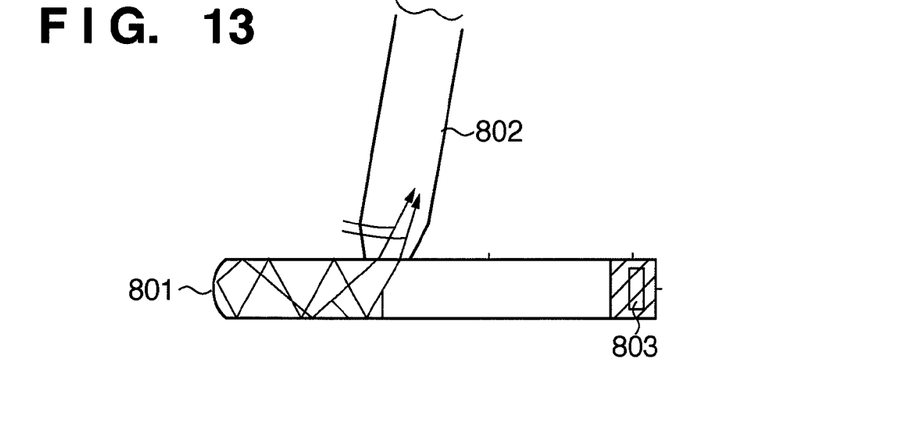
FIG. 13 is a diagram illustrating another example of a conventional touch sensor.

FIG. 13 is a diagram illustrating an optical touch panel with a light emitting surface and a light receiving surface unexposed on the surface, which is disclosed in Japanese Patent Laid-Open No. 2000-259347. A light guide plate is provided on a field sequential display apparatus such as a liquid crystal display panel, and a light source and a line sensor for detection are disposed on side faces of the light guide plate. Then, light 801 is supplied from the light source on the side face of the light guide, and a detected object 802 composed of a material such that the light is absorbed by the object to be detected or guided light toward the object is used as an indicating device for a touch panel. Optical signals, which are changed by absorbing light irradiation from the side face when the indicating device touches the surface of the light guide plate, are detected by the line sensor 803 for detection.

However, in the touch panel in U.S. Pat. No. 4,868,551, in principle, all of the light propagated in the panel is focused on the photodetector for detection Thus, when such a touch panel is used in an environment where there is external light, an amount of light to which has been added the external light over the entire surface reaches the single point that is the receiving element.

More specifically, background components of signals proportional to the product of the width and length of the face constituting the touch panel appear, the ratio of the signal to be detected to the background component (hereinafter, this index is referred to as contrast) is significantly decreased, and it becomes difficult to detect the position indicated.

Further, there is fundamentally an essential problem that the display disposed under the panel always has to operate in a scanning manner, and displays that operate in a non-scanning manner are thus inoperative because the operating principle is not able to be applied.

Moreover, for the touch panel in Japanese Patent Laid-Open No. 2000-259347, indicating devices which are not dedicated indicating devices, such as, for example, a finger, are not be able to be used. Since a finger is not an ideal light absorber, most of the light is diffused or reflected by the epidermis or dermis of the finger, and therefore most of the light is returned to the light guide panel of the touch panel. Therefore, in principle, the contrast will be lowered. Further, the presence of external light further reduces the essentially already low contrast, thus making it more difficult to detect the position indicated.

However, for touch panels for mobile devices such as digital cameras and cellular phones, which are assumed to be operated with a variety of indicating devices such as a finger or a gloved finger in a variety of environments such as outdoors, it is strongly desired to reduce the influence of external light on the touch panels. Further, it is strongly desired for the touch panels to operate precisely even when indicating devices such as a finger or a gloved finger are used.

SUMMARY OF THE INVENTION

The present invention has been made in consideration of the above situation, and has as its object to reduce the effect of external light on sensitivity and accuracy in a touch panel.

According to the present invention, the foregoing object is attained by providing a touch panel comprising: a light guide including a first face for detecting a position of an object in contact therewith and a second face opposite the first face; and a line sensor adapted to receive light emitted from a side face of the light guide, wherein the light guide guides a portion of light reflected by the object, of light irradiation from the second face side, toward the side face.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

First Embodiment

Figure 1:
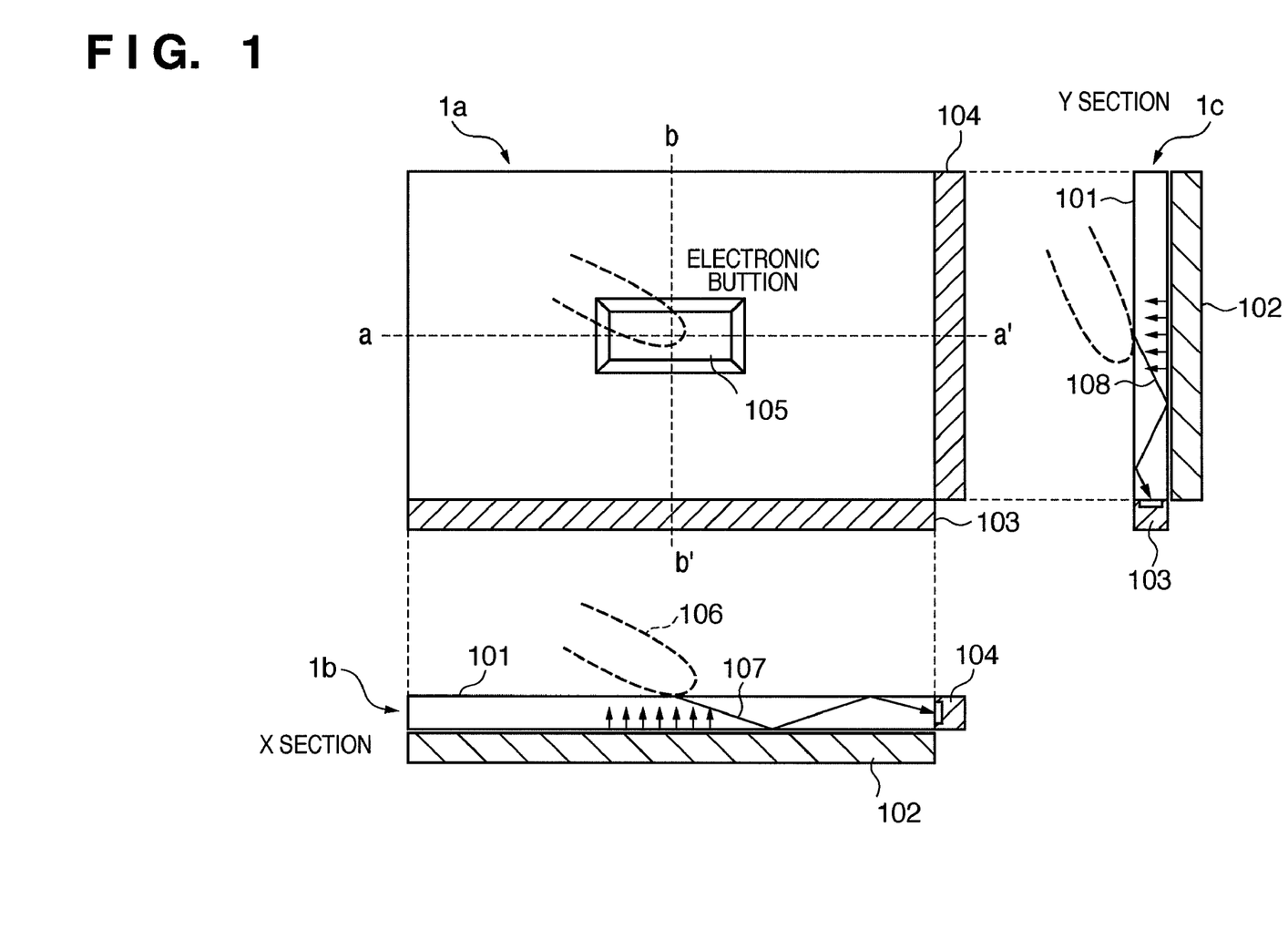
FIG. 1 is a diagram illustrating an example of the configuration of a touch sensor in a first embodiment of the present invention.

FIG. 1 is a diagram illustrating an example of the configuration of a touch panel in a first embodiment of the present invention, wherein reference numerals 1a, 1b, and 1c respectively denote a top view, a schematic cross-sectional view (X section) along the line a-a', and a schematic cross-sectional view (Y section) along the line b-b'. In FIG. 1, reference numeral 101 denotes a light guide plate for detection which is disposed for detection. As for the shape of the light guide plate, light guide plates in parallel plate shape are preferably used. The light guide plate functions as a light guide which has a first face for detecting the position of an object in contact therewith and a second face opposite the first face.

Reference numeral 102 denotes a display panel in which display elements are two-dimensionally arranged. The light guide plate 101 can also serve as a cover for the display panel 102, when the light guide plate 101 for detection is disposed such that the rear face (second face) of the light guide plate 101 for detection lies next to the display panel 102. Reference numerals 103 and 104 denote line sensors for detecting light to obtain signals, which are respectively disposed on sides (a first side face and a second side face) in the Y direction and the X direction. On the display panel 102, an electronic button 105 with a certain degree of luminance is displayed in any background. It should be noted that the line sensor includes a sensor capable of obtaining a signal of a line, and an area sensor may be used for obtaining an optical signal of a line.

As the material of the light guide plate 101, various materials can be employed, such as, for example, glass, acrylics, or plastics. The light guide plate 101 may be any material as long as the material has a relatively high refractive index as compared with the substance (air in the present embodiment) located on the front face (first face) and the rear face (second face) and has a reasonably high transparency.

Next, operation of the touch panel shown in FIG. 1 will be described in detail. First, the X section shown by the view 1b in FIG. 1 will be described. When an indicating device such as a finger, as denoted by reference numeral 106, touches the electronic button 105, light emitted from the electronic button 105 strikes the indicating device 106 and is reflected or scattered to return to the light guide plate 101. A beam 107 of the light is subjected to total internal reflection in the light guide plate 101, and detected as an optical signal at a certain pixel on the line sensor 104.

Also in the Y section shown by the view 1c in FIG. 1, the touch panel operates in accordance with the same principle, where light as typified by a beam 108 is subjected to total internal reflection in the light guide plate 101, through reflection or scattering from the indicating device 106, and detected as an optical signal at a certain pixel on the line sensor 103.

Figure 2A:
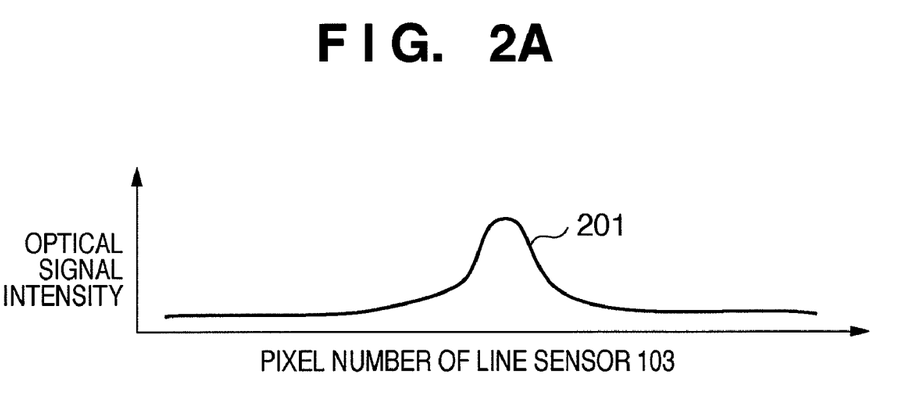
FIGS. 2A and 2B are diagrams illustrating examples of waveforms of optical signals obtained by line sensors in the first embodiment of the present invention.
Figure 2B:
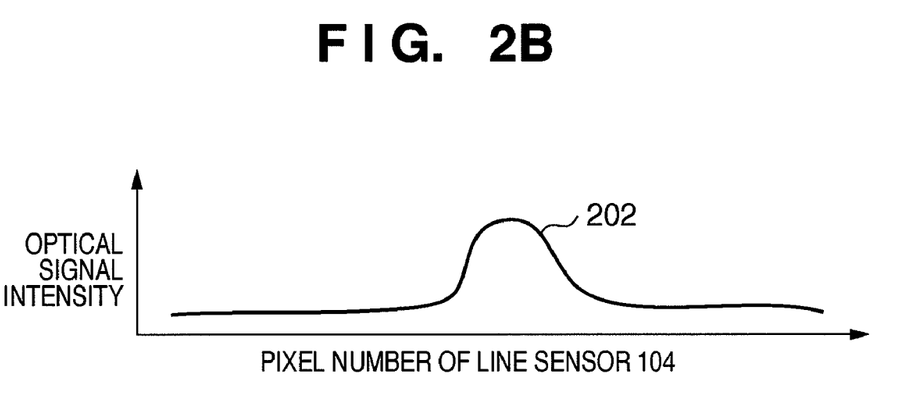

FIGS. 2A and 2B are diagrams showing the intensities of optical signals detected and output by the line sensors 103 and 104 of the touch panel in operation as shown in FIG. 1, respectively. The horizontal axis indicates a pixel location in the line sensor 103 or 104, which corresponds to the X coordinate or Y coordinate of the touch panel, whereas the vertical axis indicates an optical signal value detected and output by the line sensor. Although the intensity of the signal can normally take discrete values with respect to the X axis, data is schematically illustrated here as continuous curves.

When light diffused or reflected by the indicating device 106 is subjected to total internal reflection a number of times in the light guide plate 101 and detected by the line sensors 103 and 104, the position of the indicating device 106 shows waveforms with peaks as indicated by reference numerals 201 and 202 as a projected image. When these peaks are converted into coordinates by image processing, the touched X coordinate and Y coordinate can be identified to specify the position the indicating device 106 has touched on the touch panel. It is to be noted that the configuration (not shown) for specifying, based on signals from the line sensors 103 and 104, the position the indicating device has touched, may be configured integrally with the touch panel, or may be implemented as software by use of a computer or the like.

As described above, according to the first embodiment, reflected light of incident light from the rear side of the light guide, that is, from the face opposite the detection face of the light guide, is detected with a plurality of line sensors. Then, the reflected light is detected as X projection data and Y projection data, with a peak at the position the indicating device (for example, a finger) has touched. On the other hand, optical signals in the region the indicating device has not touched, that is, background components, will be almost equal to zero. As a result, the contrast between the signals will be significantly increased.

Further, even if external light enters, the external light is not added up over the entire panel as in U.S. Pat. No. 4,868,551. Since signals proportional to only the width or length itself of the panel, not to the product of the width and length of the panel, appear as background components to the line sensors, the panel is intrinsically less affected by the external light than the configuration shown in U.S. Pat. No. 4,868,551. Further, the original contrast is quite large as compared with the touch panel of the configuration shown in Japanese Patent Laid-Open No. 2000-259347, and thus not affected by some degree of external light.

As described above, it becomes possible to provide a touch panel that reduces the effect of external light on the sensitivity and accuracy of the touch panel.

It is to be noted that although the two line sensors are provided on the two orthogonal sides of the rectangular panel in the first embodiment, the present invention is not to be considered limited to this configuration. For example, when the panel has a polygonal shape other than rectangular, line sensors may be disposed on two sides that are at least not opposite each other. Alternatively, it is also possible to increase obtainable pieces of data by disposing line sensors on more than two sides, thus improving the sensitivity and accuracy. Further, line sensors can be used which are equally disposed one-to-one on side faces of the light guide plate. Besides, line sensors may be used which detect a portion of light reflected by an object through a lens or a pinhole and guided toward the side face. Depending on the application, it is conceivable that what is needed is to be able to determine only the position on one axis, and in this case, what is needed is to provide a line sensor on at lease one side face.

Second Embodiment

Figure 3:
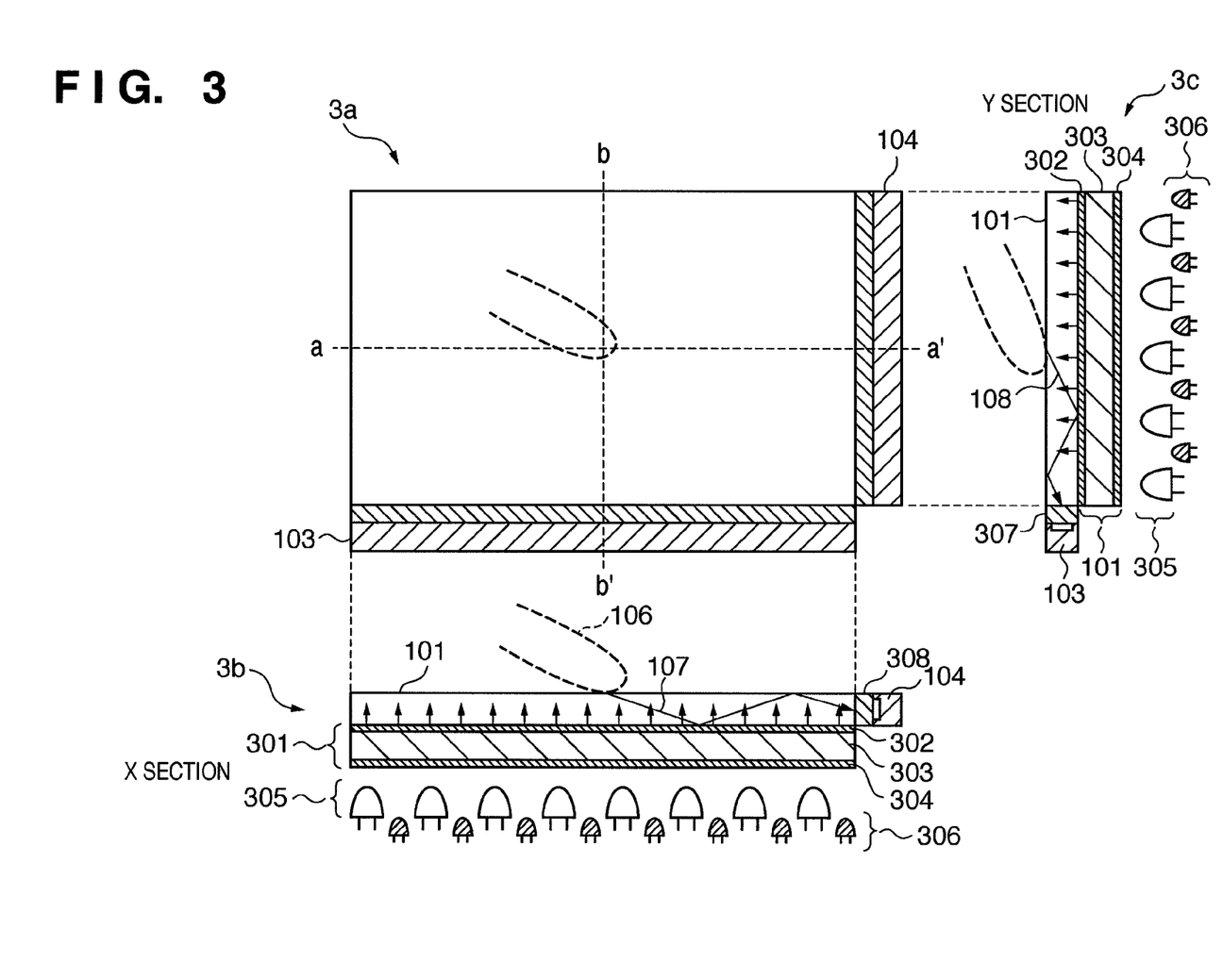
FIG. 3 is a diagram illustrating an example of the configuration of a touch sensor in a second embodiment of the present invention.

FIG. 3 is a diagram illustrating an example of the configuration of a touch panel in a second embodiment of the present invention, where reference numerals 3a, 3b, and 3c respectively denote a top view, a schematic cross-sectional view (X section) along the line a-a', and a schematic cross-sectional view (Y section) along the line b-b'. It is to be noted that the same elements as those in FIG. 1 are denoted by the same reference numerals, and descriptions thereof will be omitted.

In FIG. 3, reference numeral 301 denotes a liquid crystal display panel in the second embodiment, which is composed of a polarization plate 302, a liquid crystal unit 303, and a polarization plate 304. The liquid crystal display panel 301 includes, on the rear side thereof, a plurality of light emitting elements which emit visible light, and as backlight, light sources 305 for display (first light sources) arranged at constant intervals over the entire liquid crystal display panel 301. The liquid crystal display panel 301 and the light sources 305 for display together function as a display. Further, separately from the light sources 305 for display, the liquid crystal display panel 301 includes light sources 306 for detection (second light sources), composed of a plurality of light emitting elements which mainly emit light of a wavelength $\lambda$ in the infrared region which is invisible light, arranged at constant intervals over the entire liquid crystal display panel 301. Preferably, the emission wavelength of the light sources 306 for detection is different from the emission wavelength of the light sources 305 for display, and more preferably longer than the upper limit of the emission wavelength of the light sources 305 for display.

As described above, the second embodiment is characterized in that the light sources 306 for detection are provided separately from the light sources 305 for display.

Further, line sensors 103 and 104 are respectively provided with, on front faces thereof, visible light cut filters 307 and 308 which selectively transmit mainly the emission wavelength $\lambda$ of the light sources 306 for detection but transmit no visible light. Further, in the touch panel of the second embodiment, the polarization plates 302 and 304 are designed to have the ability to polarize invisible light of the wavelength $\lambda_0$ as little as possible. Moreover, the liquid crystal unit 303 is designed to polarize invisible light of the wavelength $\lambda_0$ as little as possible in all of possible states of the liquid crystal during display.

Next, operation of the touch panel shown in FIG. 3 will be described in detail.

The liquid crystal display panel 301, in combination with the light sources 305 for display, functions as a panel for normal display for visible light. At the same time, since irradiation with invisible light of the wavelength $\lambda_0$ is constantly carried out by the light sources 306 for detection, a portion of the invisible light is reflected by an indicating device 106 when the indicating device 106 touches a light guide plate 101. Then, the reflected light, as indicated by beams 107 and 108, is subjected to total internal reflection to propagate in the light guide plate 101, and passes through the visible light cut filters 307 and 308 to reach the line sensors 103 and 104. Since the light which has reached the line sensors 103 and 104 indicates the X coordinate and Y coordinate of the position on the panel the indicating device 106 has touched, as in the first embodiment, it becomes possible to detect the contact position.

It is to be noted that, although light for display irradiated from the light sources 305 for display also propagates immediately up to the visible light cut filters 307 and 308 in accordance with the same principle, the visible light cut filters 307 and 308 prevent the light for display from reaching the line sensors 103 and 104. Therefore, the light for display has no effect on detection of the contact position.

As described above, according to the second embodiment, it becomes possible to provide a touch panel with reduced effect of external light on the sensitivity and accuracy of the touch panel, as in the first embodiment. Further, an almost constant amount of infrared light is supplied to the light guide plate, and only the infrared light is detected by the line sensor. Therefore, it becomes possible to provide a touch panel that is capable of precise position detection regardless of display.

Further, light of a wavelength different from light for screen display is used for position detection, and thus the light of the wavelength for display can be selectively cut before it reaches the line sensors. Therefore, it becomes possible to prevent the light for display from causing wrong operation in position detection.

It is to be noted that although the liquid crystal display panel 301 is used in the second embodiment, a display panel configured based on self-luminous pixels can be also used such as, for example, an organic EL display panel. In that case, the light sources for display become unnecessary, and moreover, it is sufficient that the material and structure of the substrate and the elements have adequate transmittance with respect to the infrared light that the display panel uses for detection.

Third Embodiment

Figure 4:
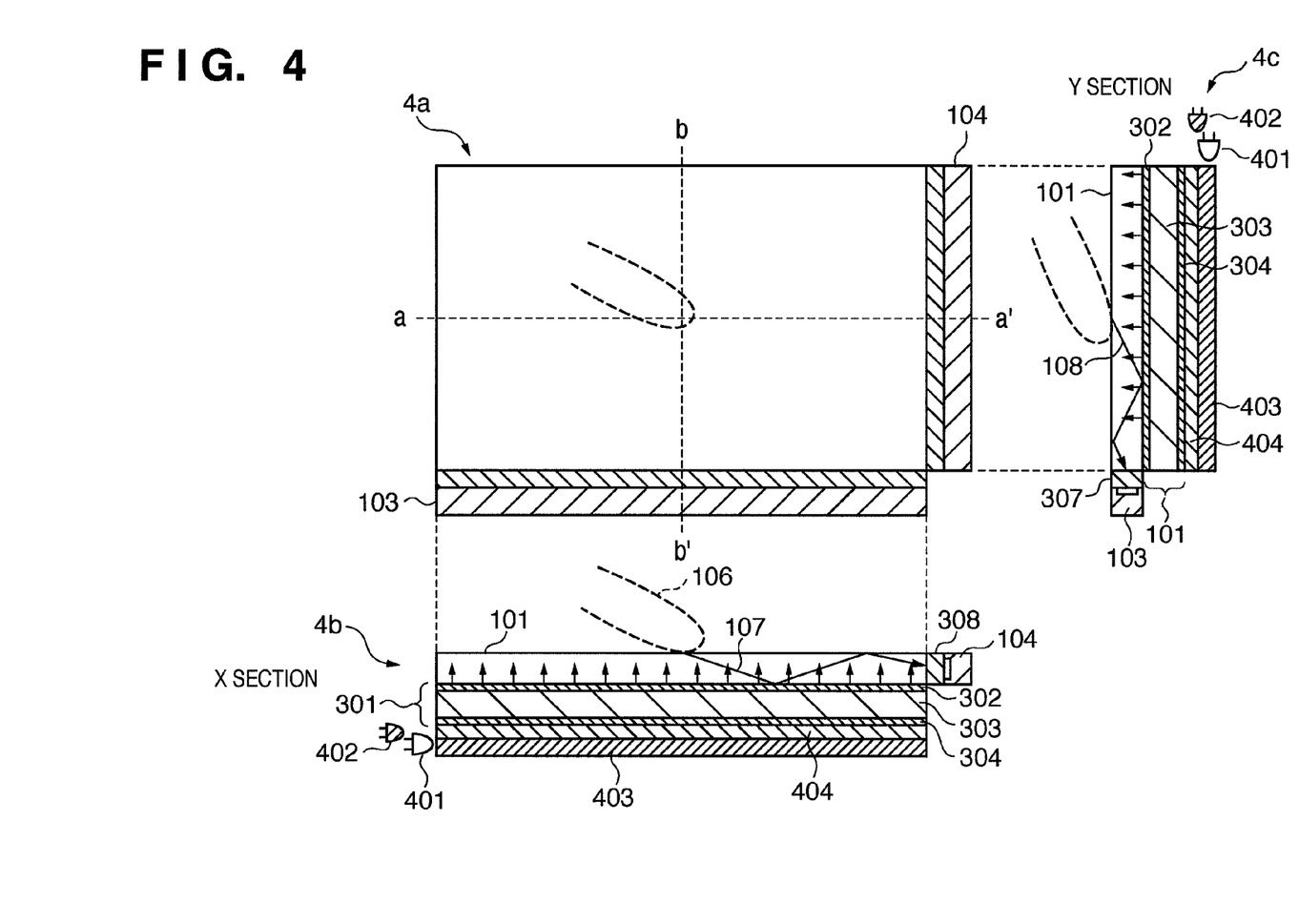
FIG. 4 is a diagram illustrating an example of the configuration of a touch sensor in a third embodiment of the present invention.

FIG. 4 is a diagram illustrating an example of the configuration of a touch panel in a third embodiment of the present invention, where reference numerals 4a, 4b, and 4c respectively denote a top view, a schematic cross-sectional view (X section) along the line a-a', and a schematic cross-sectional view (Y section) along the line b-b'. It is to be noted that the same elements as those in FIGS. 1 and 3 are denoted by the same reference numerals, and descriptions thereof will be omitted. The third embodiment is different from the second embodiment described above in the configurations of the light sources for display and the light sources for detection. The configurations of the light sources for display and the light sources for detection will be described in detail below.

Reference numeral 401 denotes a light emitting element for display (first light emitting element) to be used for display, and a light emitting element 402 for detection (second light emitting element) is closely disposed which mainly emits light of a wavelength $\lambda$ in the infrared region which is invisible light. Reference numeral 403 denotes a light guide plate for a light source, which converts light from the light emitting element 401 for display and the light emitting element 402 for detection into a surface light source for supplying the light to the entire panel, and reference numeral 404 denotes a diffuser panel provided for the purpose of equalizing light from the light guide plate 403 toward a liquid crystal display panel 301. According to the third embodiment, the light emitting element 401 for display, the light guide plate 403, and the diffuser panel 404 achieve a function as a light source for display (a first light source), whereas the light emitting element 402 for detection, the light guide plate 403, and the diffuser panel 404 achieve a function as a light source for detection (a second light source). As described above, the light guide plate 403 and the diffuser panel 404 are shared as part of the first light source and part of the second light source. It is to be noted that a pattern for diffusing light may be formed directly on the light guide plate and used without the use of the diffuser panel.

It is to be noted that operation of the touch panel in the third embodiment is similar to that in the second embodiment described above, and description thereof is thus omitted.

As described above, according to the third embodiment, the same advantageous effects as those of the second embodiment described above can be obtained. Further, since the shared usage of the light guide plate and the diffuser plate, which are used in conventional display panels, supplies light from the locally disposed infrared radiation source to the entire panel, the number of infrared light sources for detection can be thus reduced, and the cost of the light source for detection can be thus reduced.

Fourth Embodiment

Figure 5:
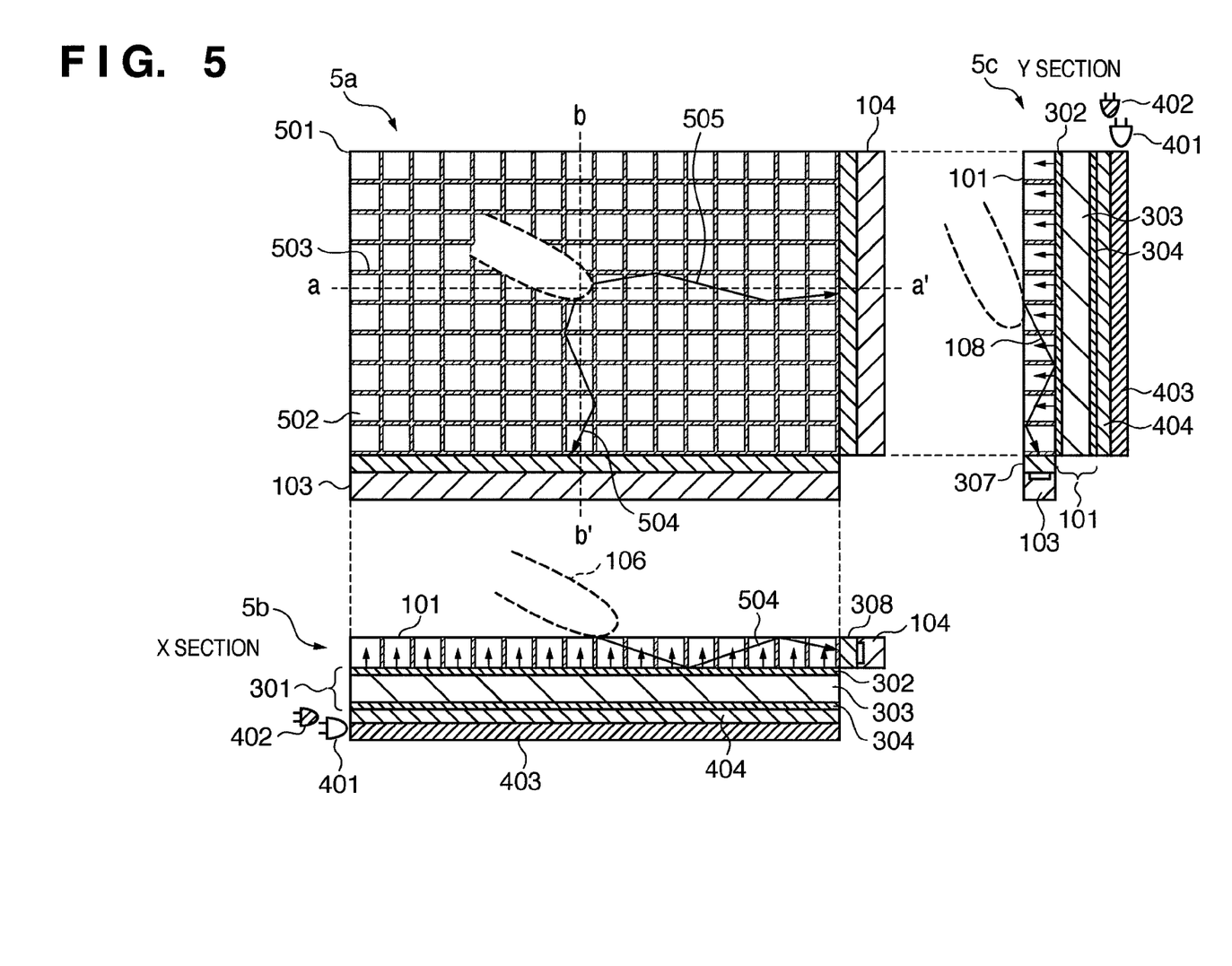
FIG. 5 is a diagram illustrating an example of the configuration of a touch sensor in a fourth embodiment of the present invention.

FIG. 5 is a diagram illustrating an example of the configuration of a touch panel in a fourth embodiment of the present invention, where reference numerals 5a, 5b, and 5c respectively denote a top view, a schematic cross-sectional view (X section) along the line a-a', and a schematic cross-sectional view (Y section) along the line b-b'. It is to be noted that the same elements as those in FIG. 4 are denoted by the same reference numerals, and descriptions thereof will be omitted. The configuration of the touch panel in the fourth embodiment is different from the first to third embodiments described above in the structure of a light guide plate 501 for detection, which is disposed on a front face of a display panel. The structure of the light guide plate 501 will be described in detail below.

The light guide plate 501 for detection on the touch face is composed of, as shown in FIG. 5, a plurality of main light guides 502 for detection (first light guides) arranged at constant intervals and a net-shaped sub light guide 503 for detection (second light guide) filling gaps between the main light guides 502 for detection. It is to be noted that the main light guide 502 has a relatively high refractive index (first refractive index) with respect to the refractive index (second refractive index) of the sub light guide 503.

A light beam 504 reflected by an indicating device 106 is subjected to total internal reflection a number of times in the Z direction to propagate towards line sensors 103 and 104, in the same way as in conventional examples. Further, the magnitude relation between the refractive indexes of the main light guide 502 and the sub light guide 503 also results in total internal reflection at interfaces between the main light guides 502 and the sub light guide 503 in the XY plane of the light guide plate 501, as indicated by light beams 504 and 505. Then, the reflected light reaches the line sensors 103 and 104.

As described above, in the fourth embodiment, the light guide plate 501 itself has directionality on the XY plane, where light reflected by the indicating device 106 is subjected to total internal reflection a number of times in the both X direction and Y direction to reach the line sensors. Accordingly, the peaks of signals will appear clearly on the line sensors 103 and 104, and the detection sensitivity can be thus improved.

Fifth Embodiment

Figure 6:
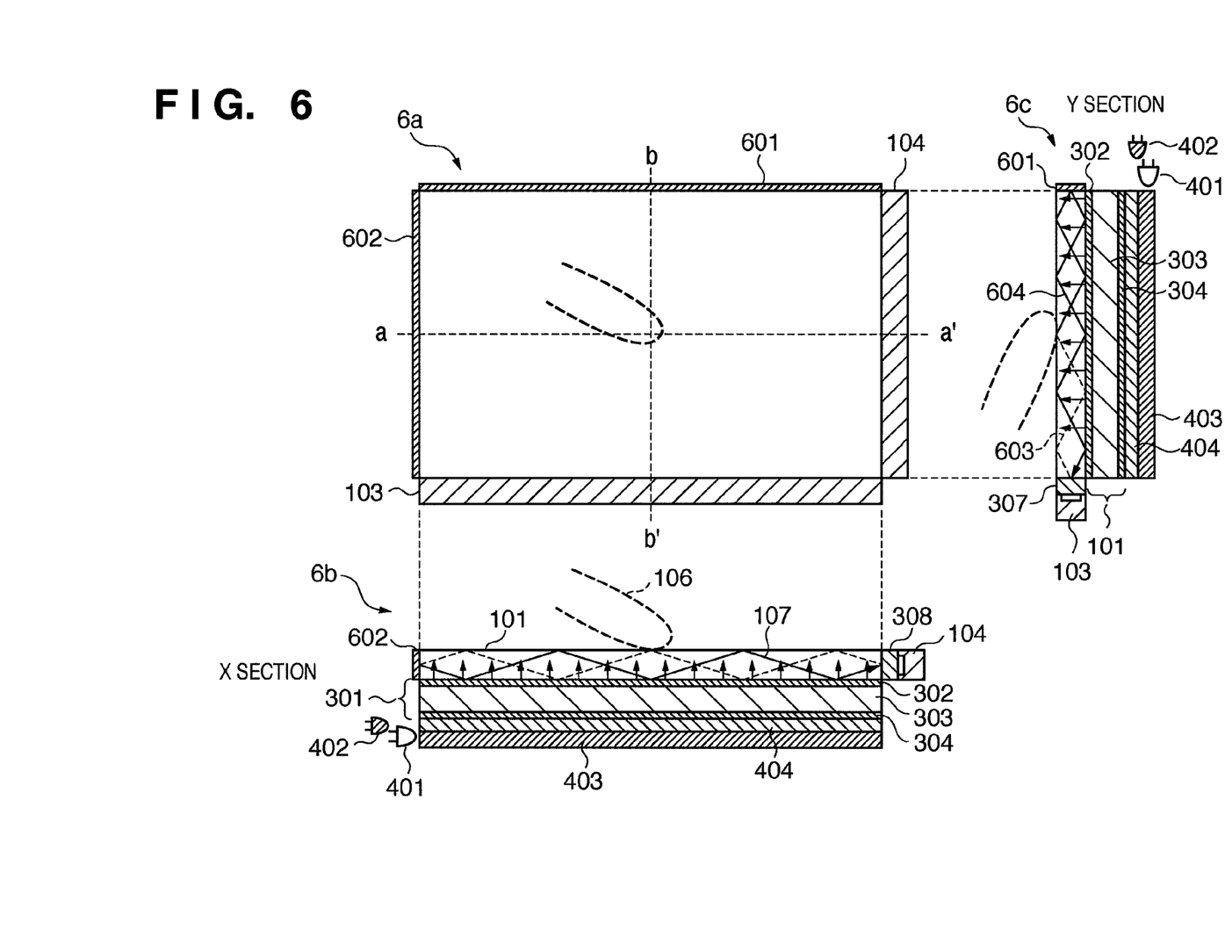
FIG. 6 is a diagram illustrating an example of the configuration of a touch sensor in a fifth embodiment of the present invention.

FIG. 6 is a diagram illustrating an example of the configuration of a touch panel in a fifth embodiment of the present invention, where reference numerals 6a, 6b and 6c respectively denote a top view, a schematic cross-sectional view (X section) along the line a-a', and a schematic cross-sectional view (Y section) along the line b-b'. It is to be noted that the same elements as those in FIG. 4 are denoted by the same reference numerals, and descriptions thereof will be omitted. The great difference between the third embodiment and the present embodiment is that a light guide plate 101 for detection has mirror-like reflector plates 601 and 602 (reflective members) provided on end faces of the light guide plate 101 for detection opposed to line sensors 103 and 104. The reflector plates 601 and 602 will be described below.

Touching with an indicating device 106 produces reflected light beams as indicated by light beams 603 and 604 in the Y section diagram 6c. The light beam 603 (broken line) propagates toward the line sensor 103 in the same manner as in the embodiments described above. On the other hand, the fifth embodiment is wherein the light beam 604 (solid line), which propagates through the light guide plate in the opposite direction away from the line sensor 103, is reflected by the reflector plate 601 and propagated toward the line sensor 103.

A light beam is also propagated in the X section in the same way as in the Y section.

As described above, according to the fifth embodiment, even if light beams reflected by the indicating device propagate toward the opposite side away from the line sensor, the light can be reflected by the reflector plates 601 and 602 to return to the line sensor sides without loss, and the signals can be thus detected more successfully. Therefore, the light intensity of the signals is further increased as compared with the first to fourth embodiments, so that signals with a high SN ratio can be obtained on the line sensors.

Sixth Embodiment

Figure 7A:
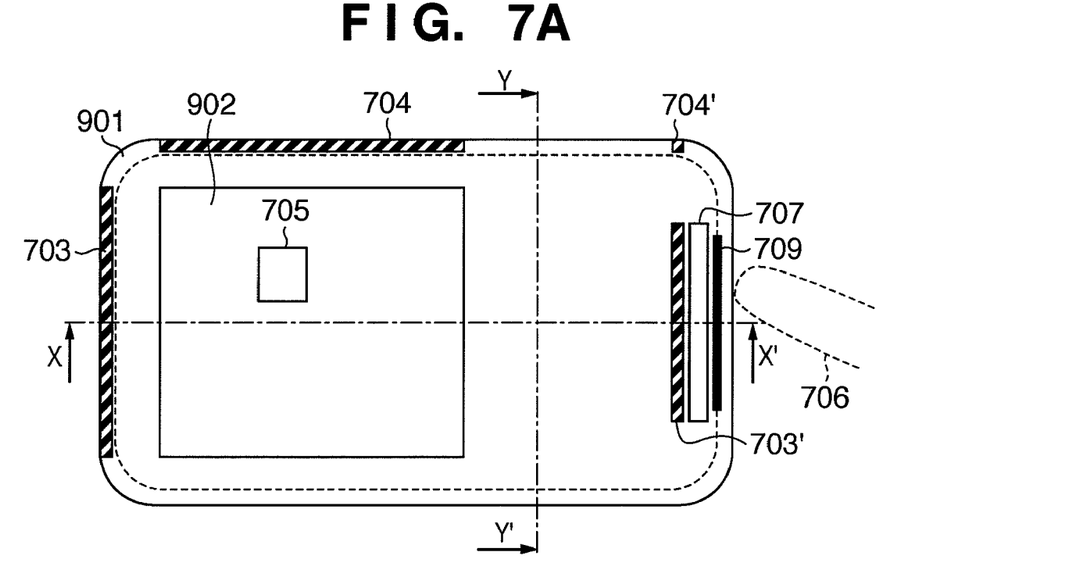
FIGS. 7A to 7C are diagrams illustrating an example of the configuration of a touch sensor in a sixth embodiment of the present invention.
Figure 7B:
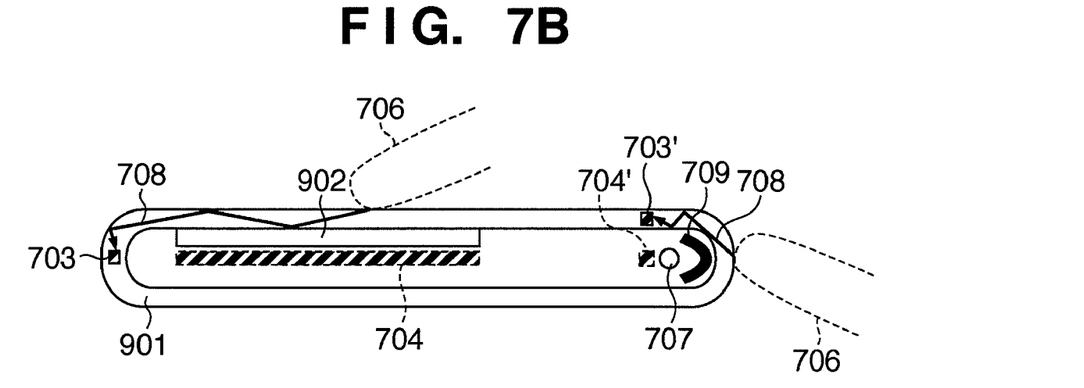
Figure 7C:
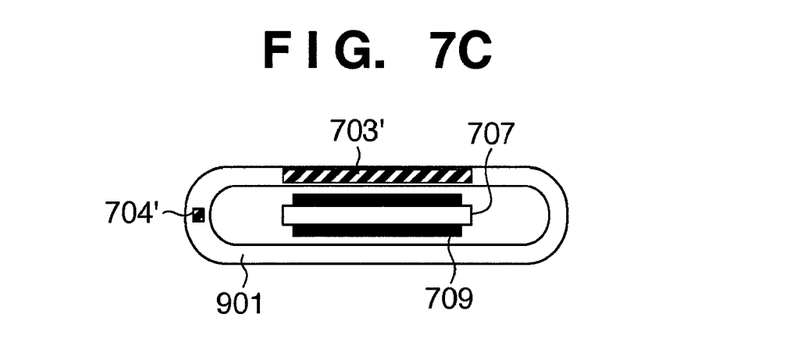

FIGS. 7A to 7C are diagrams illustrating an example of the configuration of a touch panel in a sixth embodiment of the present invention.

As compared to the first to fifth embodiments described above, the sixth embodiment differs in the shape of the light guide. Specifically, the sixth embodiment is characterized in that the light guide has a shape with a curved surface. For example, there is a demand for touch panels mounted on display surfaces of CRTs, and in order to ensure the design freedom of equipment for which it is an item of importance to distinguish from other products, there is further a demand for touch panels mounted on every side of the equipment. Thus, it is challenging to develop touch panels without limiting the designs thereof.

The sixth embodiment provides a touch panel that can be mounted on various curved surfaces and allows the design freedom to be increased. The configuration of a light guide with a curved surface and a line sensor for receiving light guided by a light guide will be described in detail.

FIGS. 7A to 7C are diagrams illustrating an example of the configuration of the touch panel in the sixth embodiment of the present invention, where FIG. 7A is a top view, FIG. 7B is a schematic cross-sectional view (X section) along the line X-X', and FIG. 7C is a cross section along the line Y-Y' viewing the right of FIG. 7A. In FIGS. 7A to 7C, reference numeral 901 denotes a light guide for detection, which is disposed for detection. As shown in the figures, the light guide 901 has curved corners which are portions of the light guide 901, and thus has a curved surface. As for the shape of the light guide, light guides with curved surfaces formed by bending light guides in parallel plate shape and light guides with curved surfaces preformed are preferable used. The light guide 901 functions as a light guide which has a first face for detecting the position of an object in contact therewith and a second face opposite the first face.

Reference numeral 902 denotes a display panel in which display elements are two-dimensionally arranged. The light guide 901 can also serve as a cover for a display panel 902, when the light guide 901 is disposed such that the rear face (second face) of the light guide 901 lies next to the display panel 902. On the display panel 902, an electronic button 705 with a certain degree of luminance is displayed in any background. A button icon 709 is printed on a side face of the apparatus, and a light source 707 is disposed on the opposite side of the button icon 709 from the light guide 901. Reference numerals 703, 704, 703', and 704' denote line sensors for detecting light to obtain signals, which are disposed on each of opposite sides of faces on which the electronic button 705 and the button icon 709 are disposed (a first side face and a second side face).

As the material of the light guide 901, various materials can be employed, such as, for example, glass, acrylics, or plastics. The light guide 901 may be any material as long as the material has a relatively high refractive index as compared with the substance (air in the present embodiment) located on the front face (first face) and the rear face (second face) and has a reasonably high transparency. In addition, the light guide plate need not be a single substance as long as the substance as described above is brought into close optical contact.

Next, operation of the touch panel shown in FIGS. 7A to 7C will be described in detail. First, the X section in FIG. 7B will be described. When an indicating device such as a finger, as denoted by reference numeral 706, touches the electronic button 705, light emitted from the electronic button 705 onto the indicating device 706 is reflected or scattered to return to the light guide 901. A beam 708 of the light is subjected to total internal reflection in the light guide 901, and detected as an optical signal at a certain pixel on the line sensor 704.

Also in the Y section of FIG. 7C, the touch panel operates in accordance with the same principle, where light as typified by a beam 708 is subjected to total internal reflection in the light guide 901, through reflection or scattering from the indicating device 706, and detected as an optical signal at a certain pixel on the line sensor 703.

Figure 8A:
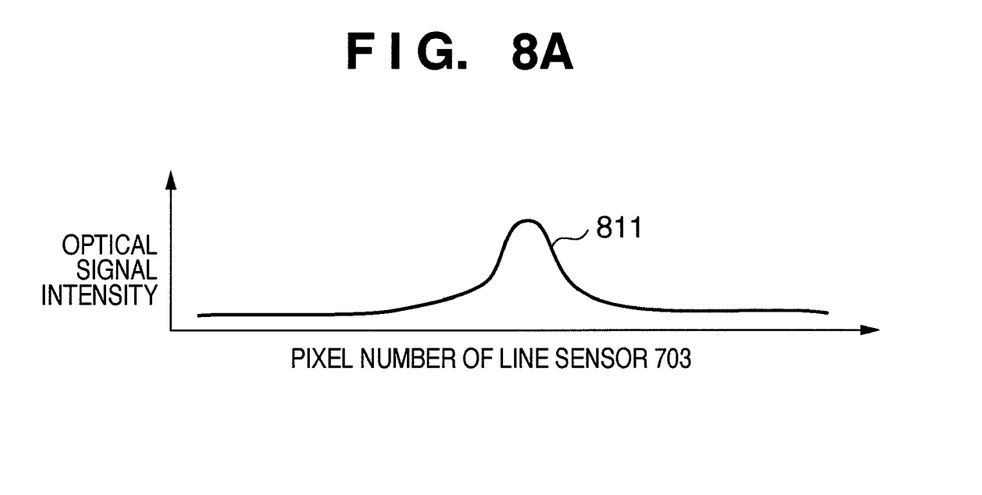
FIGS. 8A and 8B are diagrams illustrating examples of waveforms of optical signals obtained by line sensors in the sixth embodiment of the present invention.
Figure 8B:
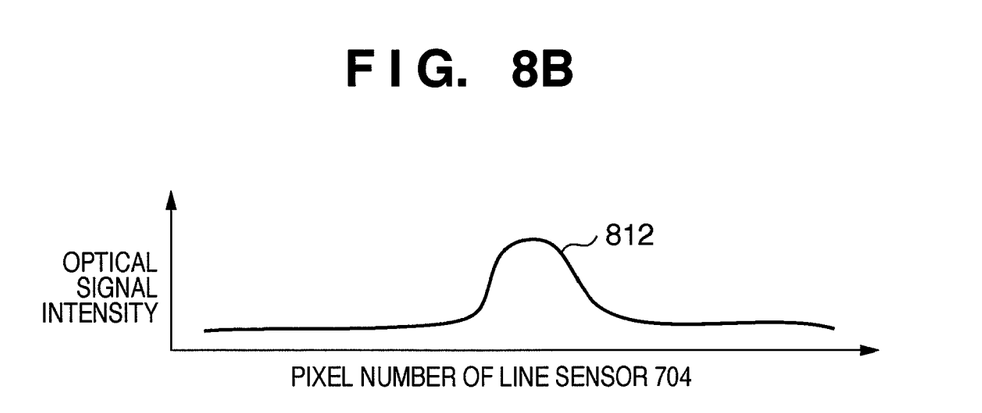

FIGS. 8A and 8B are diagrams showing the intensities of optical signals detected and output by the line sensors 703 and 704 of the touch panel in operation as shown in FIGS. 7A to 7C, respectively. The horizontal axis indicates a pixel location in the line sensor 703 or 704, which corresponds to the X coordinate or Y coordinate of the touch panel, whereas the vertical axis indicates an optical signal value detected and output by the line sensor. Although the intensity of the signal can normally take discrete values with respect to the X axis, data is schematically illustrated here as continuous curves.

When light diffused or reflected by the indicating device 706 is subjected to total internal reflection a number of times in the light guide 901 and detected by the line sensors 703 and 704, the position of the indicating device 706 shows waveforms with peaks as indicated by reference numerals 811 and 812 as projected images. When these peaks are converted into coordinates by image processing, the touched X coordinate and Y coordinate can be identified to specify the position the indicating device 706 has touched on the touch panel. It is to be noted that the configuration (not shown) for specifying, based on signals from the line sensors 703 and 704, the position the indicating device has touched, may be configured integrally with the touch panel, or may be implemented as software by use of a computer or the like. Further, the line sensors 703' and 704' can also detect the position of the indicating device in accordance with the same principle.

As described above, according to the sixth embodiment, reflected light of incident light from the rear side of the light guide for detection with the curved surface, that is, from the face opposite to the detection face of the light guide, is detected with a plurality of line sensors. Then, the reflected light is detected as X projection data and Y projection data with a peak at the position the indicating device (for example, a finger) has touched. On the other hand, optical signals in the region the indicating device has not touched, that is, background components, will be almost equal to zero. As a result, the contrast between the signals will be significantly increased.

Further, even if external light enters, the external light is not added up over the entire panel as in U.S. Pat. No. 4,868,551. Since signals proportional to only the width or length itself of the panel, not to the product of the width and length of the panel, appear as background components to the line sensors, the panel is intrinsically less affected by the external light than the configuration shown in U.S. Pat. No. 4,868,551. Further, the original contrast is quite large as compared with the touch panel of the configuration shown in Japanese Patent Laid-Open No. 2000-259347, and thus not affected by some degree of external light.

As described above, it becomes possible to provide a touch panel with a curved surface and with reduced effect of external light on the sensitivity and accuracy of the touch panel.

Seventh Embodiment

Figure 9A:
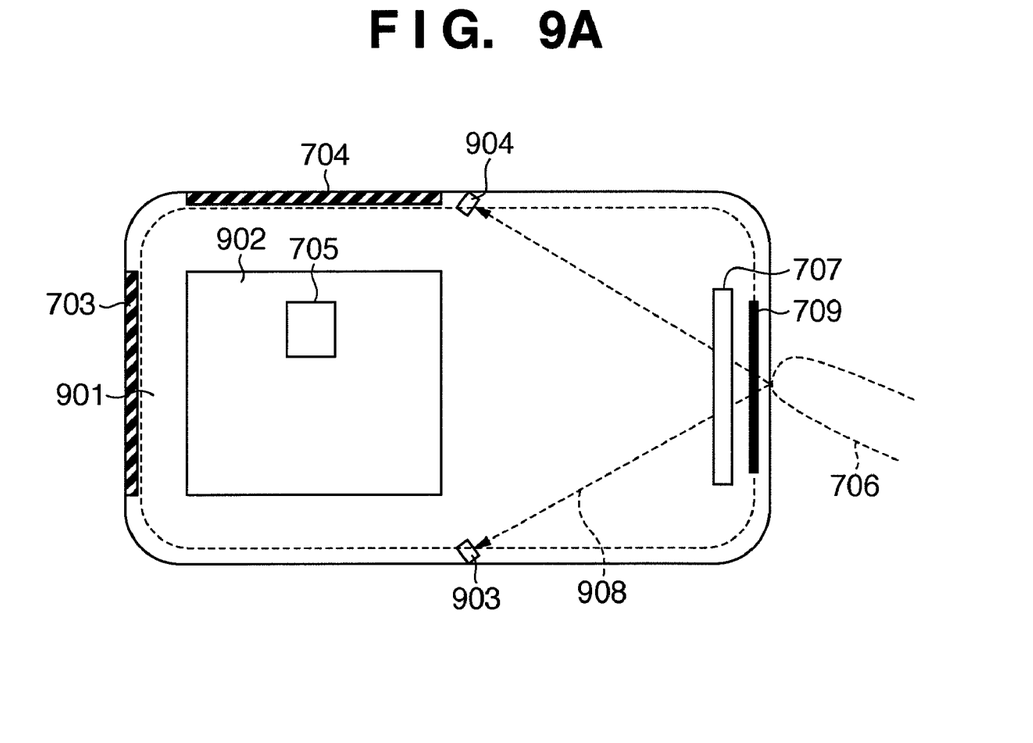
FIGS. 9A and 9B are diagrams illustrating an example of the configuration of a touch sensor in a seventh embodiment of the present invention.
Figure 9B:
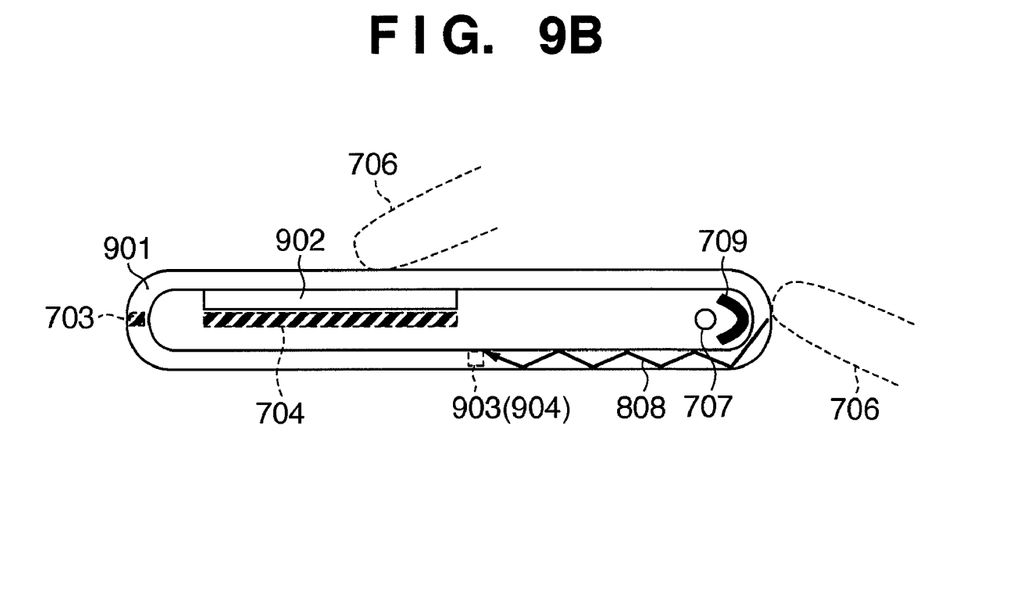

FIGS. 9A and 9B are diagrams illustrating an example of the configuration of a touch panel in a seventh embodiment of the present invention.

The seventh embodiment is different in the arrangement of line sensors as compared with the sixth embodiment. Specifically, a light guide 901 for detection has, on edges of thereof, line sensors 903 and 904 attached at angles such that light-receiving surfaces of the line sensors are nearly perpendicular to lines connecting the center of a detection region and the centers of each of the line sensors 903 and 904.

Next, operation of the touch panel shown in FIGS. 9A and 9B will be described in detail with reference to FIG. 9A and FIG. 9B which is an X section of FIG. 9A. When an indicating device such as a finger, as denoted by reference numeral 706, touches a first face of the light guide 901 corresponding to a button icon 709, light emitted from the button icon 709 strikes the indicating device 706 and is reflected or scattered to return to the light guide 901. A beam 908 of the light is subjected to total internal reflection in the light guide 901, and detected as an optical signal at certain pixels on the line sensors 903 and 904. It should be noted that the widths of the line sensors 903 and 904 are narrower than the width of the button icon 709, and therefore a lens or a pinhole is used to reduce the width of light emitted from the button icon 709 so as to match to the widths of the line sensors 903 and 904. By virtue of using the lens or the pinhole, the contrast of the projected image on the line sensors 903 and 904 increases.

Figure 10A:
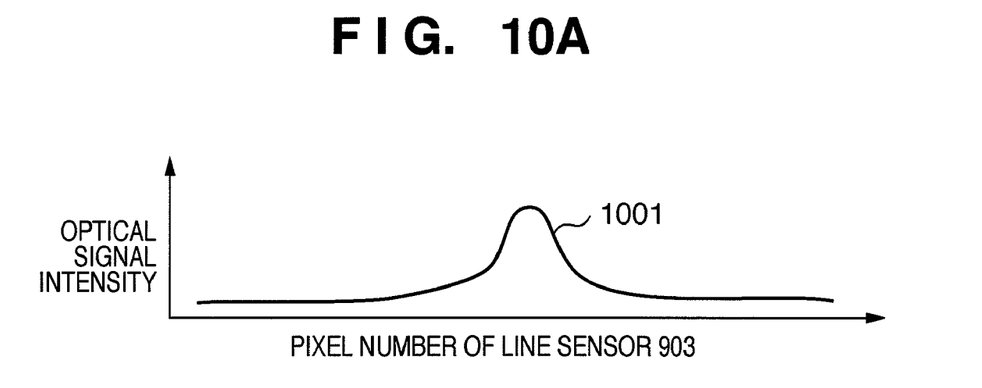
FIGS. 10A and 10B are diagrams illustrating examples of the waveform of optical signals obtained by line sensors in the seventh embodiment of the present invention.
Figure 10B:
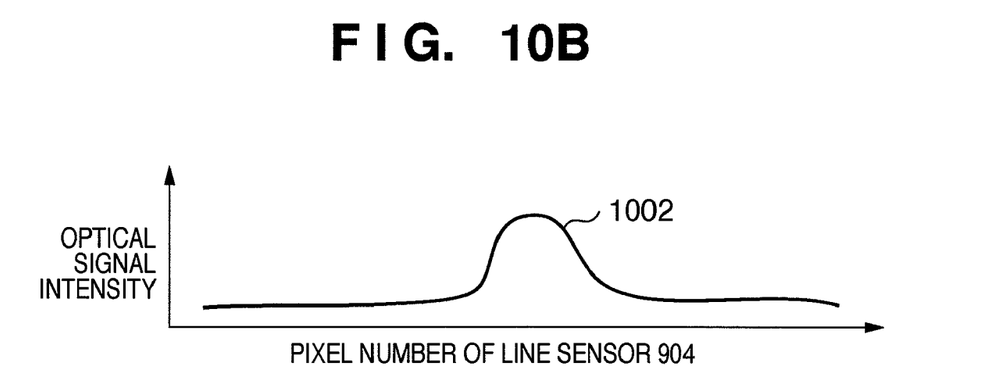

FIGS. 10A and 10B are diagrams showing the intensities of optical signals detected and output by the line sensors 903 and 904 of the touch panel in operation as shown in FIGS. 9A and 9B, respectively. The horizontal axis indicates a pixel location in the line sensor 903 or 904, whereas the vertical axis indicates an optical signal value detected and output by the line sensor. Although the intensity of the signal can normally take discrete values with respect to the longitudinal direction of the pixels, data is schematically illustrated here as continuous curves.

When light diffused or reflected by the indicating device is subjected to total internal reflection a number of times in the light guide 901 and detected by the line sensors 903 and 904, the position of the indicating device 706 shows waveforms with peaks as indicated by reference numerals 1001 and 1002 as a projected image. When these peaks are converted into coordinates by image processing, the touched coordinates can be identified to specify by triangulation the position the indicating device 706 has touched on the touch panel. It is to be noted that the configuration (not shown) for specifying, based on signals from the line sensors 903 and 904, the position the indicating device 706 has touched, may be configured integrally with the touch panel, or may be implemented by software by use of a computer or the like.

Likewise, when the indicating device 706 touches an electronic button 705, the light is reflected or scattered to return to the light guide 901, subjected to total internal reflection in the light guide 901, and detected by the line sensors 903 and 904. Then, the light is detected as optical signals in disposed line sensors 703 and 704 in the same manner as in touching the button icon 709, and the function corresponding to the electronic button 705 is realized. As described above, it becomes possible to provide a touch panel with a curved surface.

Eighth Embodiment

Figure 11:
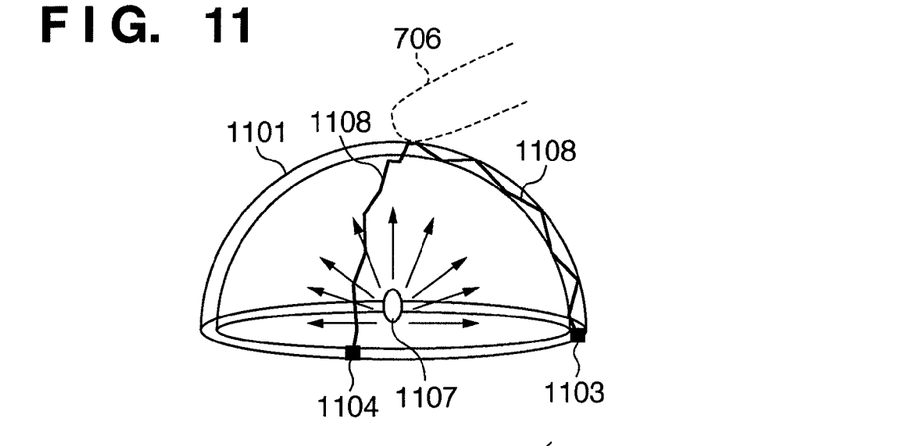
FIG. 11 is a diagram illustrating an example of the configuration of a touch sensor in an eighth embodiment of the present invention.

FIG. 11 is a diagram illustrating an example of the configuration of a touch panel in an eighth embodiment of the present invention.

The present embodiment differs from the seventh embodiment described above in that a light source 1107 for detection, as a dedicated light source, constantly irradiates the surface of a light guide 1101 for detection, and that the surface other than the developable surface can be used as a touch panel by providing a dedicated light source.

The light guide 1101 is hemispherical, and has line sensors 1103 and 1104 provided at two sites on the edge.

When an indicating device such as a finger, as denoted by reference numeral 706, touches the surface of the light guide 1101, light from the light source 1107 for detection strikes the indicating device 706 and is reflected or scattered to return to the light guide 1101. A beam 1108 of the light is subjected to total internal reflection in the light guide 1101, and detected as optical signals by the line sensors 1103 and 1104.

How to detect the touched position of the light guide 1101 is as described in the seventh embodiment.

As described above, it becomes possible to provide a touch panel with a curved surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-242910, filed on Sep. 19, 2007, and 2008-134654, filed on May 22, 2008, which are hereby incorporated by reference herein in their entirety.

What is claimed is:

1. A touch panel comprising:
a light guide including a first face for detecting a position of an object in contact therewith and a second face opposite the first face; and
a line sensor constructed to receive light emitted from a side face of the light guide,
wherein the light guide guides a portion of light reflected by the object, of light irradiation from the second face side, toward the side face, and
wherein the light guide comprises:
a plurality of first light guide units which have a first refractive index and are arranged at constant intervals; and
a second light guide unit which has a second refractive index lower than the first refractive index and fills gaps between the first light guide units.

2. The touch panel according to claim 1, further comprising:
a first light source constructed to irradiate visible light to be used for display of a display panel in which display elements are arrayed;
a second light source constructed to irradiate invisible light of a wavelength different from the first light source from the second face toward the first face;
another line sensor, arranged on another side face of the light guide, constructed to receive light emitted from the other side face of the light guide; and
visible light cut filters, respectively provided between light-receiving surfaces of the line sensors and the side faces of the light guide, constructed to cut the visible light,
wherein the light guide guides a portion of light reflected by the object, the reflected portion of light comprising light irradiation from the second face, toward at least one of the side faces.

3. The touch panel according to claim 2, wherein the side faces of the light guide include a first side face and a second side face which are not opposite to each other, and the line sensors are arranged on the first and second side faces.

4. The touch panel according to claim 2, wherein each of the first light source and the second light source comprises a plurality of light emitting elements arranged at constant intervals over the entire display panel.

5. The touch panel according to claim 2, wherein the first light source includes at least one first light emitting element which emits the visible light and a light guide for a light source,
the second light source includes at least one second light emitting element which emits the invisible light and the light guide for a light source, and
the light guide for a light source is shared by the first and second light sources, and guides the visible light and invisible light from the first and second light emitting elements over the entire display panel.

6. The touch panel according to claim 2, wherein the invisible light is infrared radiation.

7. The touch panel according to claim 1, further comprising a reflective member provided on a side face of the light guide opposite to a side face on which the line sensor is arranged.

8. The touch panel according to claim 1, further comprising a specification unit constructed to specify a position in the light guide of an object in contact with the light guide based on a position of the line sensor with a peak signal value of signals output from of the line sensor.

9. The touch panel according to claim 1, wherein a portion of the light guide has a curved surface.

* * * * *